(12) United States Patent
Riepe et al.

(10) Patent No.: US 9,231,336 B2
(45) Date of Patent: Jan. 5, 2016

(54) DEVICE FOR FIXING A CABLE TO A CABLE OUTLET CONNECTOR

(75) Inventors: Dieter Riepe, Luebbecke (DE); Bernard Schlegel, Rahden (DE)

(73) Assignee: HARTING ELECTRIC GMBH & CO. KG, Espelkamp (DE)

( * ) Notice: Subject to any disclaimer, the term of this patent is extended or adjusted under 35 U.S.C. 154(b) by 0 days.

(21) Appl. No.: 13/978,728

(22) PCT Filed: Aug. 31, 2011

(86) PCT No.: PCT/DE2011/075204
§ 371 (c)(1),
(2), (4) Date: Jul. 9, 2013

(87) PCT Pub. No.: WO2012/095089
PCT Pub. Date: Jul. 19, 2012

(65) Prior Publication Data
US 2013/0288515 A1 Oct. 31, 2013

(30) Foreign Application Priority Data
Jan. 13, 2011 (DE) .......................... 10 2011 000 124

(51) Int. Cl.
*H01R 13/58* (2006.01)
*H02G 3/06* (2006.01)
*H02G 3/08* (2006.01)

(52) U.S. Cl.
CPC ............ *H01R 13/58* (2013.01); *H01R 13/5825* (2013.01); *H02G 3/0641* (2013.01); *H02G 3/0691* (2013.01); *H02G 3/088* (2013.01)

(58) Field of Classification Search
CPC .................................................. H01R 13/5825

USPC ......... 439/471, 459, 460, 470, 445, 449, 274, 439/275; 174/653, 656–659
See application file for complete search history.

(56) References Cited

U.S. PATENT DOCUMENTS

| 4,150,250 A * | 4/1979 | Lundeberg .................... 174/655 |
| 4,632,488 A * | 12/1986 | Long et al. .................... 439/452 |
| 5,350,204 A | 9/1994 | Henniger | |
| 6,849,803 B1 | 2/2005 | Gretz | |
| 2006/0141827 A1 | 6/2006 | Auray et al. | |
| 2007/0020990 A1* | 1/2007 | Nad .............................. 439/470 |
| 2008/0105450 A1 | 5/2008 | Ooi et al. | |
| 2011/0155457 A1* | 6/2011 | Horinaka ...................... 174/659 |

FOREIGN PATENT DOCUMENTS

DE 3128541 2/1983
DE 3440103 7/1987
(Continued)

*Primary Examiner* — Renee S Luebke
*Assistant Examiner* — Paul Baillargeon
(74) *Attorney, Agent, or Firm* — Jacobson Holman, PLLC.

(57) ABSTRACT

The invention relates to a device for fixing a cable to a cable outlet connector (30), consisting of a clamping sleeve (2), a locking collar (20), and a locking slide (10), wherein the locking collar (20) encloses at least a part of the cable outlet connector (30) and at the same time encloses at least a part of the clamping sleeve (2), whereby the clamping sleeve (2) is held on the cable outlet connector (30), and wherein the locking slide (10) can be introduced into a guide (21) of the locking collar (20) provided for this purpose, and wherein the locking slide (10) comprises detent openings (12) which engage via detents (31) of the cable outlet connector (30) provided for this purpose such that the clamping sleeve (2), the locking collar (20) and the cable outlet connector (30) are captively connected to each other.

9 Claims, 4 Drawing Sheets

(56) References Cited

FOREIGN PATENT DOCUMENTS

| DE | 19526927 | 1/1997 |
|----|----------|--------|
| DE | 102004020819 | 2/2006 |
| DE | 102007012190 | 9/2008 |
| EP | 0627588 | 11/1996 |
| GB | 2102637 | 2/1983 |

* cited by examiner

DEVICE FOR FIXING A CABLE TO A CABLE OUTLET CONNECTOR

This is a national stage of PCT/DE11/075204 filed Aug. 31, 2011 and published in German, which has a priority of German no. 10 2011 000 124.7 filed Jan. 13, 2011, hereby incorporated by reference.

The invention concerns a device for fixing a cable to a cable outlet connector or gland comprising a clamping sleeve, a locking collar and a locking slider.

Such devices for fixing a cable to a cable outlet connector or gland are required to hold cables to cable outlets of plug connector housings, switch cabinets or the like, in non-rotatable and tensile force-resistant relationship.

DE 10 2007 012 190 A1 discloses a device for passing cables through a wall opening. The device is captively fixed to the wall. The cables are clamped fast in the device by means of a clamping device.

DE 34 40 103 C2 also discloses a wall penetration duct for lines, for example for electric cables. Coupling holders are provided, which can be pushed over the coupling ends that are to be coupled together.

DE 195 26 927 A1 shows a sealing socket for passing lines through a wall opening. The sealing socket is secured to the wall surface by a securing portion which can be pushed thereon.

DE 10 2004 020 819 B4 discloses a connecting element between two end portions of a line in hose or tube form.

EP 0 627 588 B1 discloses a cable screw means for securing a cable to a cable outlet connector. The connector is provided with individual flexible clamping tongues which, when a union nut is screwed thereon, are guided against a seal which is pushed over the cable sheathing and thus clamp the seal in place and at the same time also the cable.

When the clamping tongues are pressed together it can happen that the pressing pressure exerted on the cable by way of the seal does not attain the required level for securing the cable in non-rotational and tensile force-resistant relationship.

DE 3 128 541 C1 discloses a cable screw means with a securing means to prevent accidental release. It will be noted however that the cable screw means here requires a special tool.

The object of the invention is that of proposing a cable fixing which avoids the above-indicated deficiencies and which can be easily fitted in place.

That object is attained by the characterising features of claim 1.

Advantageous configurations of the invention are recited in the appendant claims.

A cable strain relief and sealing system is generally integrated in a cable fixing element, for example a cable screw arrangement. The cable fixing according to the invention substantially comprises the components clamping sleeve, locking collar and locking slider which in operative interrelationship with the cable strain relief and sealing system fix a cable on a cable outlet connector of a plug connector housing. The cable can be for example a multi-wire cable.

The locking collar is substantially in the form of a flat component having two side surfaces projecting at a right angle therefrom. Provided centrally in the locking collar is a round opening which can receive the lower part of the clamping sleeve. The two projecting side surfaces surround the upper part of the cable outlet connector.

A radially outwardly directed edge is formed at the lower part of the clamping sleeve. The radius of the peripherally extending edge is larger than the radius of the round opening of the locking collar. The locking sleeve is guided between the projecting side surfaces of the locking collar through the round opening thereof. When now the locking collar is disposed on the cable outlet connector the peripherally extending edge of the clamping sleeve prevents the clamping sleeve from being removable from the cable outlet connector. The clamping sleeve is held on the cable outlet connector by the locking collar.

The locking slider is substantially in the form of a U-shaped component. The two side arms of the locking slider can be introduced into guides provided for same on the locking collar. The guides are formed within the projecting side surfaces of the locking collar. The side arms of the locking slider include latching openings which engage over latching noses provided for same on the cable outlet connector.

When the locking slider is introduced entirely in the radial direction of the cable outlet connector into the locking sleeve the components clamping sleeve, locking collar and cable outlet connector are non-losably connected together.

Advantageously provided at the side surfaces of the locking collar at the inward side are delimitation noses which delimit the depth of penetration of the locking slider into the locking collar. The locking slider includes at the lateral arms respective so-called delimitation pins which are guided against the delimitation noses when the maximum depth of insertion is reached.

Advantageously the locking slider includes a so-called actuation portion. The actuation portion projects from the locking slider in opposite relationship to the lateral arms and is provided with a gripping surface for manual use. The actuation portion serves to be able to pull the locking slider in the inserted condition (in the locked condition) out of the locking collar. In that way the components comprising the clamping sleeve, the locking collar and the cable outlet connector can be separated from each other again.

An embodiment of the invention is described in greater detail hereinafter and illustrated in the drawings in which.

Figure 5:
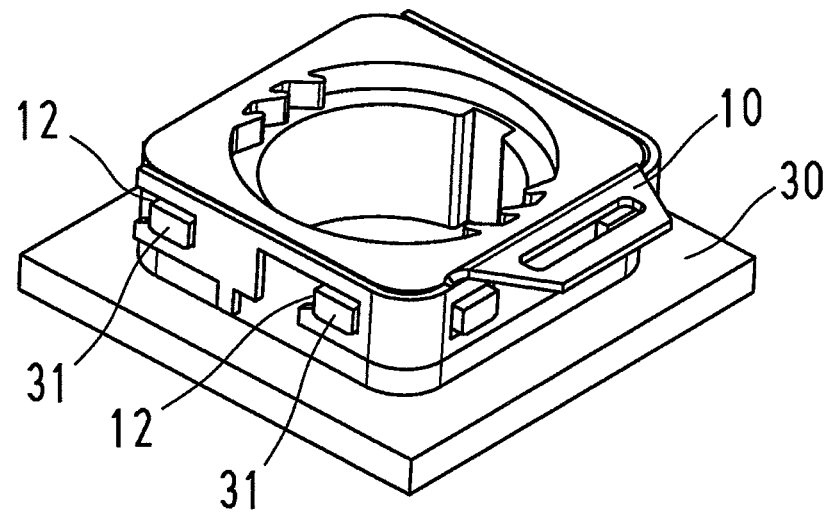
Figure 6:
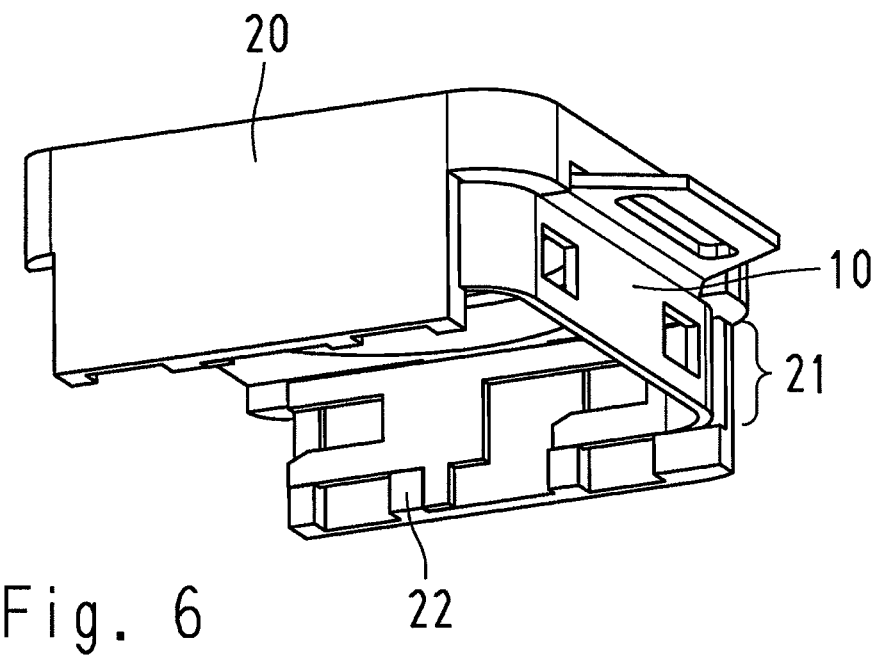
Figure 8:
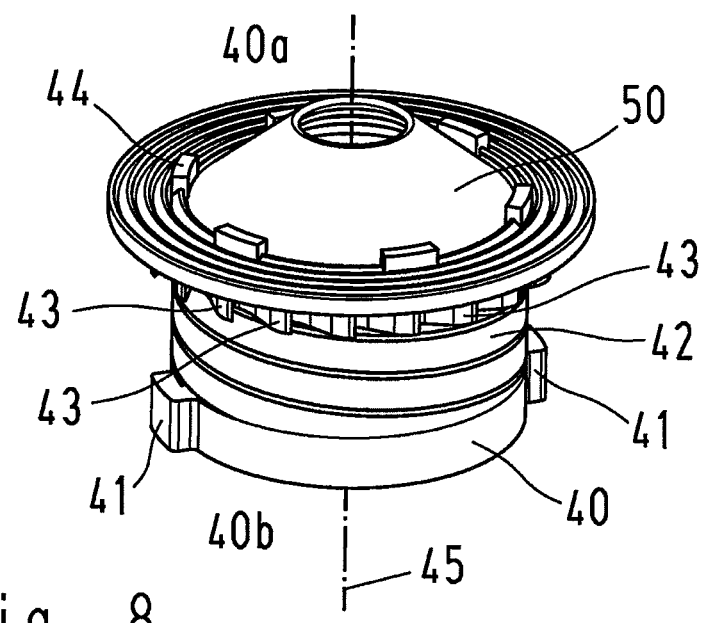
Figures 9A, 9B:
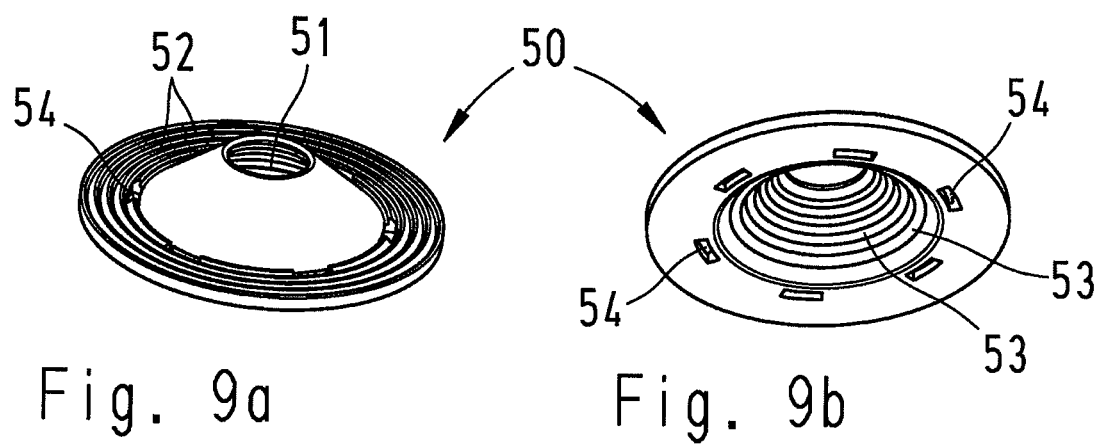
Figure 7:
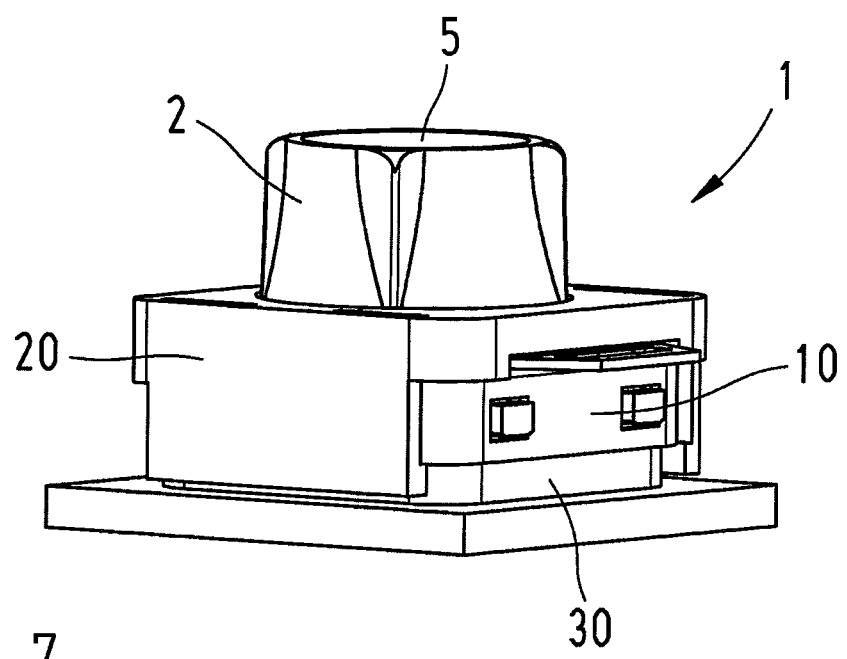

FIG. 5 shows a perspective view of the cable outlet connector with locking slider pushed thereon, FIG. 6 shows a perspective view of the locking collar with inserted locking slider, FIG. 7 shows a perspective view of the entire device for fixing a cable to a cable outlet connector, FIG. 8 shows a perspective view of a cable strain relief element with connected sealing element, FIG. 9*a* shows a perspective view of the sealing element, and FIG. 9*b* shows a further perspective view of the sealing element.

Figure 1:
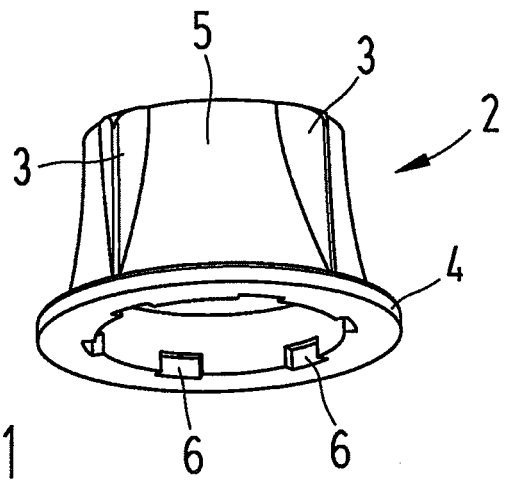
FIG. 1 shows a perspective view of a clamping sleeve.

FIG. 1 shows a perspective view of a clamping sleeve 2. The clamping sleeve is of a substantially cylindrical configuration, narrowing a little in a funnel shape in the cable outlet direction.

Figure 2:
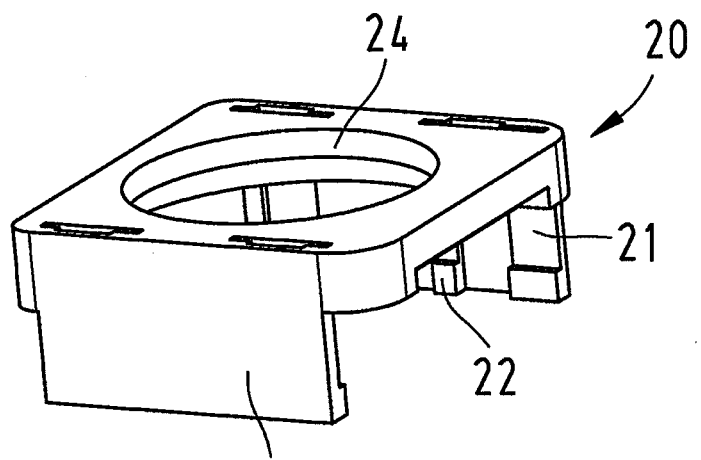
FIG. 2 shows a perspective view of a locking collar.
Figure 3:
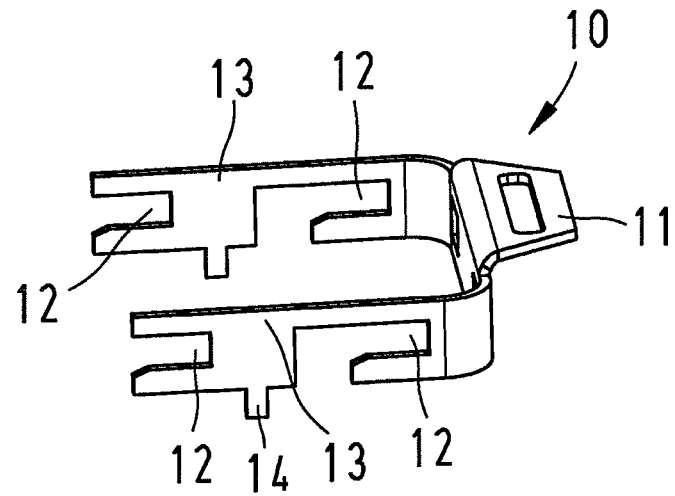
FIG. 3 shows a perspective view of a locking slider.

FIG. 2 shows a perspective view of a locking collar 20. The locking collar 20 substantially comprises a flat, almost rectangular region from which two side surfaces 23 project at one side, being in mutually opposite relationship. The sides of the side surfaces 23, that are directed towards each other, include guides 21 provided for receiving the side arms 13 of the actuation slider 10 (FIG. 3).

Figure 4:
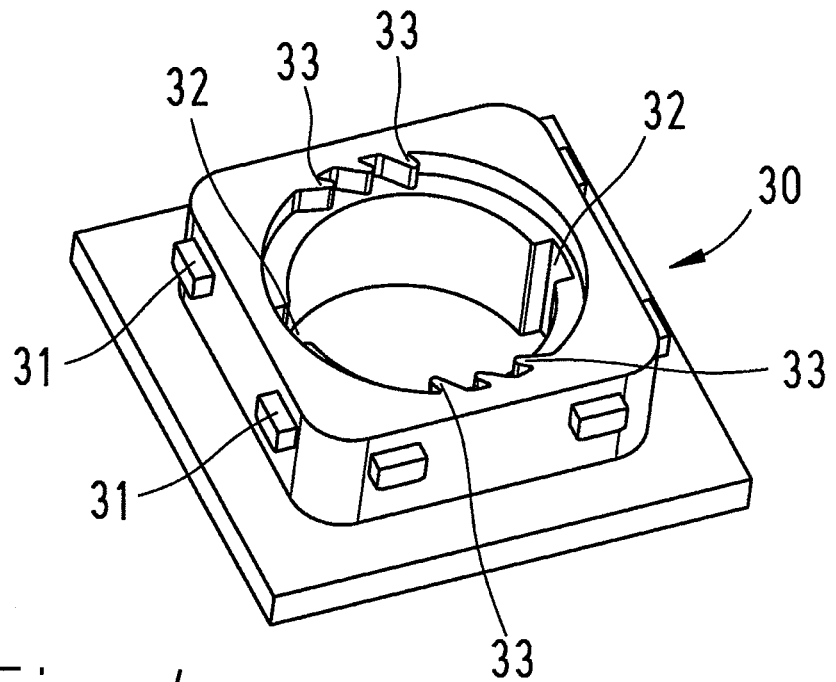
FIG. 4 shows a perspective view of a cable outlet connector.

Latching openings 12 are formed in the side arms 13 of the actuation slider 10. The latching openings 12 are provided to grip over latching noses 31 of the cable outlet connector 30 (FIG. 4).

FIG. 5 shows a perspective view of the cable outlet connector 30 with locking slider 10 pushed thereon. It can be clearly seen how the latching noses 31 lie in the latching openings 12.

FIG. 6 shows a perspective view of the locking collar 20 with inserted locking slider 10. The side arms 13 of the locking slider 10 are disposed in the guides 21 provided for same on the locking collar 20. So that the locking slider 10 can be pushed into the locking collar only as far as a given depth, formed on the side arms 13 of the locking slider 10 are delimitation pins 14 which upon the insertion movement are guided against delimitation noses 22 of the locking collar 20.

It is possible to see from FIG. 7 how the device 1 for fixing a cable to the cable outlet connector looks in the assembled condition. The clamping sleeve 2 is guided through the opening 24 of the locking collar 20. The radially outwardly facing, peripherally extending edge 4 of the clamping sleeve 2 prevents the clamping sleeve from being able to be pushed entirely through the opening 24. The radius of the peripherally extending edge 4 is larger than the radius of the opening 24. A cable to be connected (not shown in any of the Figures for clarity of the drawing) would project out of the opening 5 of the clamping sleeve 2. The clamping sleeve 2 is held on the cable outlet connector 30 by way of the locking collar 20.

As already mentioned hereinbefore the projecting arms 13 of the locking slider 10 engage into guides 21 of the locking collar 20. At the same time the latching openings 12 of the locking slider 10 engage over latching noses 31 of the cable outlet connector 30. When the locking slider 10 is pushed in, the components consisting of the clamping sleeve 2, the locking collar 20, the locking slider 10 and the cable outlet connector 30 are non-losably connected together.

The function of the cable strain relief arrangement is described hereinafter.

FIG. 8 shows a cable strain relief element 40 together with a sealing element 50. At its first side 40a the cable strain relief element 40 is connected to the sealing element 50. The sealing element 50 (FIGS. 9a and 9b) has openings 54 which are guided over axially projecting entrainment contours 44 of the cable strain relief element 40. The oppositely disposed side 40b of the cable strain relief element 40 includes radially projecting contours 41.

The contours 41 of the cable strain relief element 40 are guided in recesses 32 provided for same in the cable outlet connector 30, whereby the cable strain relief element 40 is fixed at that end 40b non-rotatably about its axial axis 45. Radially projecting latching hooks 43 are arranged at the first end 40a of the cable strain relief element 40. The cable strain relief element 40 is of a coil-shaped (helical) configuration between the ends 40a and 40b.

The latching hooks 43 of the cable strain relief element 40 latch with clamping contours 33 arranged within the cable outlet connector 30. The latching hooks 43 comprise flexible material (for example plastic material). The clamping contours 33 and the latching hooks 43 are of such a configuration that rotation of the end 40a of the cable strain relief element 40 is possible in a direction around the axial axis 45. In that case the latching hooks 43 slide over the clamping contours 33.

On the inside the clamping sleeve 2 has recesses 6 which slide on to the entrainment contours 44 of the cable strain relief element 40. The clamping sleeve 2 and therewith also the end 40a of the cable strain relief element 40 can be rotated by way of lateral wings 3 on the clamping sleeve 2. A cable enclosed by the cable strain relief element 40 and the clamping sleeve 2 is fixed centrally by the narrowing helical structure 42. Rotation of the clamping sleeve 2 (and the end 40a of the cable strain relief element 40) in the other direction of rotation is prevented by the clamping contours 33. In this case the clamping sleeve 2 functions like a ratchet. By lifting the clamping sleeve 2, when the locking slider 10 is pulled out, the helical structure 42 of the cable strain relief element 40 can be released from the cable sheathing.

The sealing element has a cable opening 51 through which the cable is guided. The diameter of the cable opening 51 is suitably adapted to the cable diameter. At one side the sealing element 50 has pressing bar portions 52 arranged in the edge region. The pressing bar portions serve for better sealing integrity of the plug connector housing. The other side of the sealing element 50 has sealing bar portions 53 which extend along the cable opening 51. Those sealing bar portions 53 serve for better sealing integrity in relation to the connected cable.

LIST OF REFERENCES

Device for Fixing a Cable to a Cable Outlet Connector 1 device for fixing the cable
2 clamping sleeve
3 wing
4 peripherally extending edge
5 cable outlet opening
6 recess
10 locking slider
11 actuation portion
12 latching openings
13 side arm
14 delimitation pin
15
20 locking collar
21 guide
22 delimitation nose
30 cable outlet connector
31 latching noses
32 recess
33 clamping contour
34
40 cable strain relief element
40a first end
40b second end
41 contour
42 helical/coil-shaped structure
43 latching hooks
44 entrainment hooks
45 axial axis
50 sealing element
51 opening
52 pressing bar portions
53 sealing bar portions

The invention claimed is:

1. A device for fixing a cable to a cable outlet connector (30) comprising a clamping sleeve (2), a locking collar (20) and a locking slider (10),
   wherein said locking collar (20) embraces at least a part of the cable outlet connector (30) and at the same time at least a part of the clamping sleeve (2), whereby the clamping sleeve (2) is held on the cable outlet connector (30), and the locking slider (10) fits within a guide (21) provided on the locking collar (20), and the locking slider (10) includes latching openings (12) which engage over latching noses (31) provided on the cable outlet connector (30)

so that the clamping sleeve (2), the locking collar (20) and the cable outlet connector (30) are non-loosably connected to each other, wherein an inside of the locking collar (20) includes at least one delimitation nose (22) which delimits the depth of penetration of the locking slider (10) into the locking collar (20), and a cable strain relief element (40) having a helical configuration between opposite ends of the cable strain relief element, one end of the cable strain relief element fixed to the cable outlet connector (30), a second end of the cable strain relief element fixed to the clamping sleeve (2).

2. A device for fixing a cable to a cable outlet connector (30) according to claim 1 wherein said locking slider (10) is slidable onto the locking collar (20) in a radial direction of the cable outlet connector (30).

3. A device for fixing a cable to a cable outlet connector (30) according to claim 1 wherein said locking slider (10) is substantially U-shaped and includes an actuation portion (11) which is accessible to an operator from an exterior even in the locked condition.

4. A device for fixing a cable to a cable outlet connector (30) according to claim 1 wherein said cable strain relief element (40) is connected to a sealing element (50).

5. A device for fixing a cable to a cable outlet connector (30) according to claim 4 wherein said sealing element (50) includes an edge region having pressing bar portions (52) for sealing a plug connector housing.

6. A device for fixing a cable to a cable outlet connector (30) according to claim 4 wherein said sealing element (50) includes a central region having sealing bar portions (53) for sealing a connected cable.

7. A device for fixing a cable to a cable outlet connector according to claim 1 wherein the cable strain relief element is fixed to the cable outlet connector non-rotatably about an axis of said cable strain relief element (45) and is fixed to the clamping sleeve movably about the axis (45) in only one direction of rotation.

8. A device for fixing a cable to a cable outlet connector (30) comprising, a locking collar (20) having a pair of side surfaces with a guide (21) within each side surface and at least one delimitation nose (22) within at least one side surface, said locking collar including a flat region interconnecting the side surfaces with an opening (24) extending through the flat region to receive a clamping sleeve (2), a locking slider (10) having a pair of side arms, each side arm (13) including latching openings (12) and at least one delimitation pin (14) within at least one side arm, said locking slider side arms slidably fit within the guides (21) of the locking collar wherein the delimitation pin (14) of the locking slider engages with the delimitation nose (22) of the locking collar to limit penetration of the locking slider (10) within the locking collar (20), a clamping sleeve (2) affixed to said locking collar (20) and extending through said opening (24) of said locking collar (20), wherein said locking collar (20), said locking slider (10), and said clamping sleeve (2) are tightly connected to each other, a cable outlet connector (30) interconnected with said locking collar, locking sleeve, and clamping sleeve, said cable outlet connector including latching noses (31) that fit within the latching openings (12) of the locking slider (10), said cable outlet connector including a cable opening aligned with the clamping sleeve, and a cable strain relief element (40) having a helical configuration between opposite ends of the cable strain relief element, one end of the cable strain relief element fixed to the cable outlet connector (30), and a second end of the cable strain relief element connected to the clamping sleeve (2).

9. The device of claim 8, wherein said one end of said cable strain relief element (40) is non-rotatably fixed to said cable outlet connector (30), and said second end of said cable strain relief element is rotatably connected to the clamping sleeve (10) in only one direction of rotation.

* * * * *